United States Patent
Vail et al.

(10) Patent No.: US 9,546,097 B2
(45) Date of Patent: Jan. 17, 2017

(54) METHOD FOR THE SYNTHESIS OF IRON HEXACYANOFERRATE

(71) Applicant: Sharp Laboratories of America, Inc., Camas, WA (US)

(72) Inventors: Sean Vail, Vancouver, WA (US); Yuhao Lu, Vancouver, WA (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 224 days.

(21) Appl. No.: 14/472,228

(22) Filed: Aug. 28, 2014

(65) Prior Publication Data

US 2014/0370187 A1  Dec. 18, 2014

Related U.S. Application Data (63) Continuation-in-part of application No. 14/340,141, filed on Jul. 24, 2014, which is a continuation-in-part (Continued)

(51) Int. Cl.
*H01M 2/00* (2006.01)
*C01C 3/12* (2006.01)
(Continued)

(52) U.S. Cl.
CPC .............. *C01C 3/12* (2013.01); *H01M 4/0404* (2013.01); *H01M 4/0452* (2013.01);
(Continued)

(58) Field of Classification Search
CPC ........ H01M 4/58; H01M 4/04; H01M 4/5825; H01M 2/1653; H01M 2/1686; H01M 4/628; H01M 7/042; H01M 4/133; H01M 4/136; Y10T 29/49108; C01D 15/02; C01D 1/02; C01B 33/021; C01B 31/00; C01B 25/003; C01B 19/02
See application file for complete search history.

(56) References Cited

U.S. PATENT DOCUMENTS 4,029,012 A * 6/1977 Smith, III ............ A61B 5/1172
101/368

OTHER PUBLICATIONS

V.D. Neff, Some performance characteristics of a Prussian Blue battery, Journal of Electrochemical Society, 132 (1985) 1382-1384.
(Continued)

*Primary Examiner* — Emily Le
*Assistant Examiner* — Monique Wills
(74) *Attorney, Agent, or Firm* — Law Office of Gerald Maliszewski; Gerald Maliszewski (57) ABSTRACT

A method is provided for synthesizing iron hexacyanoferrate (FeHCF). The method forms a first solution of a ferrocyanide source [$A_4Fe(CN)_6 \cdot PH_2O$] material dissolved in a first solvent, where "A" is an alkali metal ion. A second solution is formed of a Fe(II) source dissolved in a second solvent. A reducing agent is added and, optionally, an alkali metal salt. The first and second solutions may be purged with an inert gas. The second solution is combined with the first solution to form a third solution in a low oxygen environment. The third solution is agitated in a low oxygen environment, and $A_{X+1}Fe_2(CN)_6 \cdot zH_2O$ is formed, where X is in the range of 0 to 1. The method isolates the $A_{X+1}Fe_2(CN)_6 \cdot zH_2O$ from the third solution, and dries the $A_{X+1}Fe_2(CN)_6 \cdot zH_2O$ under vacuum at a temperature greater than 60 degrees C.

17 Claims, 4 Drawing Sheets

Related U.S. Application Data of application No. 14/320,352, filed on Jun. 30, 2014, which is a continuation-in-part of application No. 14/271,498, filed on May 7, 2014, now Pat. No. 9,419,278, which is a continuation-in-part of application No. 14/230,882, filed on Mar. 31, 2014, which is a continuation-in-part of application No. 14/198,755, filed on Mar. 6, 2014, which is a continuation-in-part of application No. 14/198,702, filed on Mar. 6, 2014, which is a continuation-in-part of application No. 14/198,663, filed on Mar. 6, 2014, which is a continuation-in-part of application No. 14/193,782, filed on Feb. 28, 2014, which is a continuation-in-part of application No. 14/193,501, filed on Feb. 28, 2014, now Pat. No. 9,406,919, which is a continuation-in-part of application No. 14/174,171, filed on Feb. 6, 2014, now Pat. No. 9,455,431, which is a continuation-in-part of application No. 14/067,038, filed on Oct. 30, 2013, now Pat. No. 9,450,224, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.

| | | |
|---|---|---|
| *H01M 4/04* | (2006.01) | |
| *H01M 4/136* | (2010.01) | |
| *H01M 4/1397* | (2010.01) | |
| *H01M 4/58* | (2010.01) | |
| *H01M 4/62* | (2006.01) | |
| *H01M 10/052* | (2010.01) | |

(52) U.S. Cl.
CPC ......... *H01M 4/0471* (2013.01); *H01M 4/136* (2013.01); *H01M 4/1397* (2013.01); *H01M 4/58* (2013.01); *H01M 4/622* (2013.01); *H01M 4/625* (2013.01); *H01M 10/052* (2013.01); *Y02E 60/122* (2013.01)

(56) References Cited

OTHER PUBLICATIONS

N. Imanishi et al., Lithium intercalation behavior into Iron cyanide complex as positive electrode of lithium secondary battery, Journal of Power Sources, 79 (1999) 215-219.

Y. Lu, L. Wang, J. Cheng, J.B. Goodenough, Prussian blue: a new framework for sodium batteries, Chemistry Communication, 48 (2012) 6544-6546.

L. Wang, Y. Lu, J. Liu, M. Xu, J. Cheng, D. zhang J.B. Goodenough, A superior low-cost cathode for a Na-ion battery, Angew. Chem. Int. Ed., 52(2013)1964-1967

A. Eftekhari, Potassium secondary cell based on Prussian blue cathode, J.Power Sources, 126 (2004) 221-228.

C.D. Wessells, R.A. Huggins, Y. Cui, Copper hexacyanoferrate battery electrodes with long cycle life and high power, Nature Communication, 2( 2011) 550.

C.D. Wessells et al., Nickel hexacyanoferrate nanoparticle electrodes for aqueous sodium and potassium ion batteries: Nano Letter, 11(2011) 5421-5425.

C.D. Wessells et al., The effect of insertion species on nanostructured open framework hexacyanoferrate battery electrode, J. Electrochem. Soc., 159(2012) A98-A103.

T.Matsuda, M. Takachi, Y. Moritomo, A sodium manganese ferrocyanide thin film for Na-ion batteries, Chemical Communications, DOI: 10,1039/C3CC38839E.

S.-H. Yu et al., Iron hexacyanoferrate nanoparticles as cathode materials for lithium and sodium rechargeable batteries, ECS Electrochemistry Letters, 2(2013)A39-A41.

S-H. Yu, et al., "Iron Hexacyanoferrate Nanoparticles as Cathode Materials for Lithium and Sodium Rechargeable Batteries", ECS Electrochemistry Letters 2013, 2, A39-A41.

S-H. Lee and Y-D. Huh, "Preferential Evolution of Prussian Blue's Morphology from Cube to Hexapod", Bulletin of the Korean Chemical Society 2012, 33, 1078-1080.

M. Hu, J-S. Jiang, C-C. Lin, and Y. Zeng, "Prussian Blue Mesocrystals: An Example of Self-Construction", CrystEngComm 2010, 12, 2679-2683.

M. Hu, R-P. Ji, J-S. Jiang, "Hydrothermal Synthesis of Magnetite Crystals: From Sheet to Pseudo-Octahedron", Materials Research Bulletin 2010, 45, 1811-1815.

R. K. Patil, et al., "Oxidation of Thiosulfate by Hexacyanoferrate(III) in Aqueous Perchloric Acid Medium- . . . ", Indian Journal of Chemistry 2009, 48A, 357-361.

\* cited by examiner

METHOD FOR THE SYNTHESIS OF IRON HEXACYANOFERRATE

RELATED APPLICATIONS

This application is a Continuation-in-Part of an application entitled, TRANSITION METAL HEXACYANOMETALLATE ELECTRODE WITH WATER-SOLUBLE BINDER, invented by Long Wang et al, Ser. No. 14/340,141, filed Jul. 24, 2014;

which is a Continuation-in-Part of an application entitled, ELECTROLYTE ADDITIVES FOR TRANSITION METAL CYANOMETALLATE ELECTRODE STABILIZATION, invented by Yuhao Lu et al, Ser. No. 14/320,352, filed Jun. 30, 2014;

Ser. No. 14/320,352 is a Continuation-in-Part of an application entitled, RECHARGEABLE METAL-ION BATTERY WITH NON-AQUEOUS HYBRID ION ELECTROLYTE, invented by Long Wang et al, Ser. No. 14/271,498, filed May 7, 2014;

which is a Continuation-in-Part of an application entitled, REACTIVE SEPARATOR FOR A METAL-ION BATTERY, invented by Long Wang et al, Ser. No. 14/230,882, filed Mar. 31, 2014;

which is a Continuation-in-Part of an application entitled, NASICON-POLYMER ELECTROLYTE STRUCTURE, invented by Long Wang et al, Ser. No. 14/198,755, filed Mar. 6, 2014;

which is a Continuation-in-Part of an application entitled, BATTERY WITH AN ANODE PRELOADED WITH CONSUMABLE METALS, invented by Yuhao Lu et al, Ser. No. 14/198,702, filed Mar. 6, 2014;

which is a Continuation-in-Part of an application entitled, BATTERY ANODE WITH PRELOADED METALS, invented by Long Wang et al, Ser. No. 14/198,663, filed Mar. 6, 2014;

which is a Continuation-in-Part of an application entitled, METAL BATTERY ELECTRODE WITH PYROLYZED COATING, invented by Yuhao Lu et al, Ser. No. 14/193,782, filed Feb. 28, 2014;

which is a Continuation-in-Part of an application entitled, METAL HEXACYANOMETALLATE ELECTRODE WITH SHIELD STRUCTURE, invented by Yuhao Lu et al, Ser. No. 14/193,501, filed Feb. 28, 2014;

which is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014;

This application is a Continuation-in-Part of an application entitled, SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013;

which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012;

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical batteries and, more particularly, to a method for the synthesis of iron hexacyanoferrate (FeHCF, $Na_{1+x}Fe_2(CN)_6$ (x=0 to 1)).

2. Description of the Related Art

Modern rechargeable lithium batteries have triggered the portable electronic device revolution due to their high power density, long cycle life, and overall reliability. The rechargeable lithium battery consists of a cathode (positive electrode) and anode (negative electrode), separated by a lithium ion ($Li^+$)-permeable membrane. A solution or polymer rich in $Li^+$ is employed to permit facile migration of lithium ions between the positive and negative electrodes. Common positive electrode materials include transition metal oxides such as lithium cobalt oxide ($LiCoO_2$), lithium manganese oxide ($LiMn_2O_4$), and lithium iron phosphate ($LiFePO_4$), in addition to various derivatives. Within these materials, $Li^+$ can travel within the interstitial space(s) both freely and reversibly. In general, metallic lithium, alloys, and carbonaceous materials can be utilized as the negative electrode. When the rechargeable lithium battery does not include any metallic electrode, it is referred to as lithium-ion battery (LIB). During the discharge process in a lithium-ion battery, lithium ions are extracted from the negative electrode and subsequently inserted into the positive electrode. At the same time, electrons pass through an external circuit from the negative electrode to the positive electrode to generate electric power. During the charge process, ions and electrons move along the reverse directions and are ultimately restored to their original locations.

Although LIBs have been employed successfully over a broad range of commercial applications, the issue of lithium supply, as it applies to both strain on natural reserves and potential fluctuations in price, has motivated the development of a low-cost, rechargeable battery technology as an alternative to LIB. In light of this, sodium-ion batteries (NIBs) have increased in popularity due primarily to the fact that sodium has similar properties to lithium, but also boasts the benefits of both reduced cost and virtually unlimited availability. However, analogous to LIBs, NIBs require appropriate $Na^+$ host materials. Indeed, significant effort has been devoted towards the direct duplication of $Li^+$ host structures for application as $Na^+$-host electrode materials for NIBs. For example, $NaCoO_2$, $NaMnO_2$, $NaCrO_2$, and $Na_{0.85}Li_{0.17}Ni_{0.21}Mn_{0.64}O_2$ with similar layered-structure to $LiCoO_2$, have been developed for NIBs. Similarly, $Co_3O_4$ with a Spinel structure, $Na_3V_2(PO_4)_3$ with a NASICON structure, and $NaFePO_4$ with an Olivine structure have been employed in sodium batteries. In addition, sodium fluorophosphates, such as $Na_2PO_4F$, $NaVPO_4F$, and $Na_{1.5}VOPO_4F_{0.5}$ have also been utilized as the positive electrode for sodium batteries.

Overall, it appears impractical to simply adopt conventional $Li^+$ host materials and structures as $Na^+$ host compounds, since sodium ions are larger than lithium ions and, consequently, severely distort the structures of $Li^+$ host compounds during the intercalation process. In response to this, it is critical to develop new $Na^+$ host materials with large interstitial space(s) through which sodium ions can migrate, both easily and reversibly.

It is widely known that $Na^+$ and others ions readily intercalate into metal hexacyanometallate compounds. In general, Prussian Blue and its analogues belong to a class of mixed valence compounds called transition metal hexacyanometallates (TMHCMs). In addition to energy storage, these materials have been identified for applications that include electrochromics, chemical sensors (for nonelectroactive cations and hydrogen peroxide, for example), and advanced biosensors. In general, TMHCMs are characterized by a general formula corresponding to $A_xM_1^mM_2^n(CN)_6$ where $M_1^{m+}$ and $M_2^{n+}$ are transition metals with different formal oxidation numbers (m and n). In many cases, the TMHCMs can sequester a variety of different ions ("A"=$Na^+$, $K^+$, $NH_4^+$, $Co^{2+}$, $Cu^{2+}$, for example) as well as various amounts of water ($H_2O$) within the crystal structure.

Figure 1:
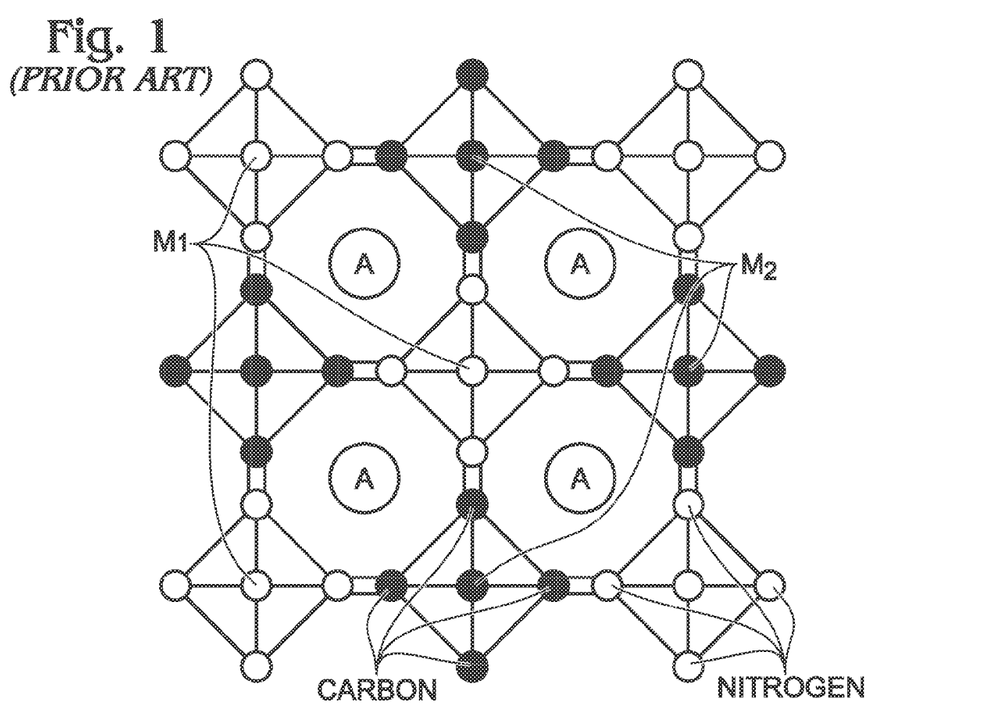
FIG. 1 is a schematic diagram depicting the crystal structure of TMHCM, which exhibits an open framework and is analogous to that of the $ABX_3$ perovskite (prior art).

FIG. 1 is a schematic diagram depicting the crystal structure of TMHCM, which exhibits an open framework and is analogous to that of the $ABX_3$ perovskite (prior art). $M_1^{m+}$ and $M_2^{n+}$ metal ions are in ordered arrangement on the B sites. The large, tetrahedrally coordinated "A" sites can host both alkali and alkaline earth ions ($A_x$) in addition to species such as ammonium ($NH_4^+$) and $H_2O$. The number of alkali (or alkaline earth ions) in the large cages of this crystallographically porous framework may vary from x=0 to x=2, which is dependent on the respective valence(s) of $M_1$ and $M_2$.

Previously, TMHCFs with large interstitial spaces have been investigated as cathode materials for rechargeable lithium-ion batteries,[1,2] sodium-ion batteries,[3,4] and potassium-ion batteries.[5] In aqueous electrolytes containing appropriate alkali metal ions or $NH_4^+$, copper and nickel hexacyanoferrates [(Cu,Ni)-HCFs] demonstrated robust cycling with 83% capacity retention after 40,000 cycles at a charge/discharge current density of 17C (1C=150 milliamps per gram).[6-8] In spite of this, the materials demonstrated low corresponding capacities and energy densities due to the fact that (1) only one sodium-ion can be inserted/extracted into/from per Cu-HCF or Ni-HCF formula, and (2) the TMHCF electrodes required operation below 1.23 V due to the electrochemical stability window for water. The electrochemical stability window of a substance is the voltage range between which the substance is neither oxidized nor reduced. This range is significant in terms of electrode efficiency since water becomes electrolyzed outside this range, which consequently cannibalizes the electrical energy intended for another electrochemical reaction.

In order to compensate for these shortcomings, manganese hexacyanoferrate (Mn-HCF) and iron hexacyanoferrate (Fe-HCF) were used as cathode materials in non-aqueous electrolyte.[9,10] For batteries containing a metallic sodium anode, Mn-HCF and Fe-HCF cathodes demonstrated capacities ~110 milliamperes hours per gram (mAh/g) when cycled between 2.0 V and 4.2 V.

Despite the significant potential for TMHCFs in secondary battery applications, it has proven extremely difficult to directly synthesize $Na_{1+x}Fe_2(CN)_6$ (x=0 to 1) through a conventional precipitation process. Specifically, upon addition of $Fe^{2+}$-containing solution to a solution of ferrocyanide [$Fe(CN)_6^{4-}$], $Fe^{2+}$-ions are almost instantaneously oxidized to $Fe^{3+}$ ions, yielding a corresponding dark blue precipitate consistent with $Na_{1-x}Fe_2(CN)_6$ (x=0 to 1).

Figure 2:
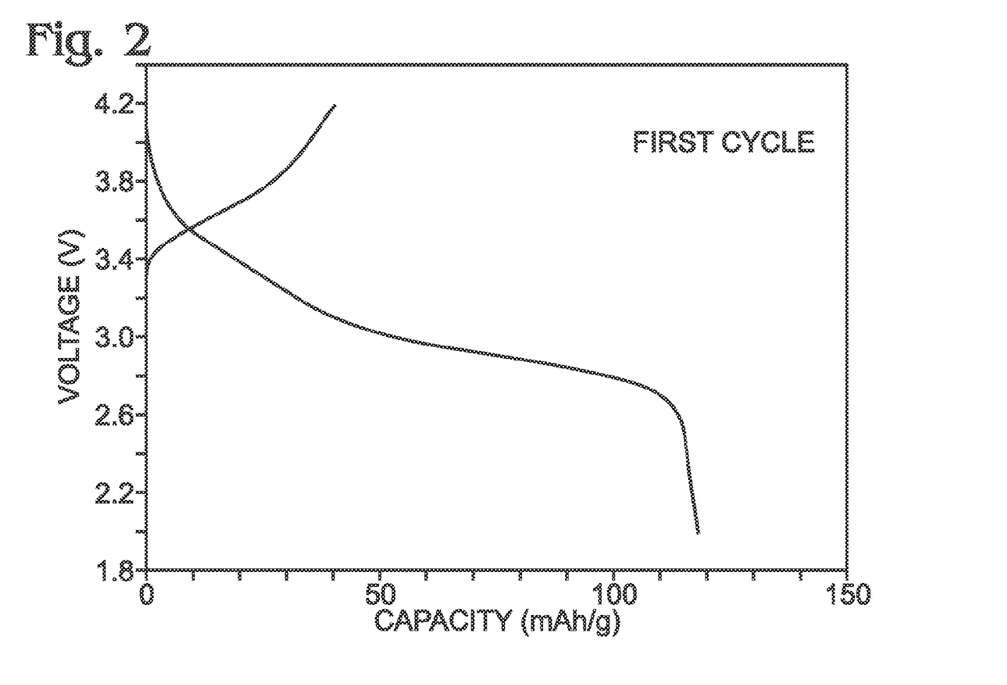
FIG. 2 is a graph depicting the capacity of a $Na_{1+x}Fe_2(CN)_6$ (x=0 to 1) electrode, the synthesis of which was unsuccessful using direct mixing of a solution of a $Fe^{2+}$ source containing $Fe(CN)_6^{4-}$.

FIG. 2 is a graph depicting the capacity of a $Na_{1+x}Fe_2(CN)_6$ (x=0 to 1) electrode, the synthesis of which was unsuccessful using direct mixing of a solution of a $Fe^{2+}$ source containing $Fe(CN)_6^{4-}$. During the first charge, the material generated a modest capacity of 40.85 milliamperes hours per gram (mAh/g), which corresponds to 0.52 $Na^+$ ions per formula unit (fu). Furthermore, thermal gravimetric analysis (TGA) confirmed 2.79 water molecules existing per fu. Thus, the molecular formula can be calculated as $Na_{0.52}Fe^{III}[Fe^{II}(CN)_6]_{1-y}\cdot 2.79H_2O$ (y<1), rather than the intended $Na_{1+x}Fe_2(CN)_6$ (x=0 to 1). Finally, the small $Na^+$ content confirms that a certain proportion of Fe(II) species in $Fe(CN)_6^{4-}$ was also oxidized during the process. Based upon these results, it would appear as if $Na_{1+x}Fe_2(CN)_6$ (x=0 to 1) cannot be readily synthesized using a conventional precipitation method.

Hu et al. reported a hydrothermal method to synthesize $K_2Fe_2(CN)_6$ from $K_4Fe(CN)_6$ in a neutral solution.[11] However, some practitioners are skeptical of this reported method of synthesizing $Na_2Fe_2(CN)_6$ due to the fact that sodium ions are smaller than potassium ions and, therefore, harder to retain in the large interstitial space of iron hexacyanoferrates (Fe-HCFs), Further, the reaction is sensitive to solution pH.[12-14] In response, Lu et al. demonstrated a modified hydrothermal reaction process to successfully synthesize sodium iron hexacyanoferrate ($Na_2Fe_2(CN)_6$) directly (U.S. Ser. No. 14/067,038, which is incorporated herein by reference). According to this method, reducing agents are included in the reaction solutions to protect Fe(II) from oxidation during the hydrothermal process.

[1] V. D. Neff, "Some Performance Characteristics of a Prussian Blue Battery", *Journal of The Electrochemical Society* 1985, 132, 1382-1384.

[2] N. Imanishi, T. Morikawa, J. Kondo, Y. Takeda, O. Yamamoto, N. Kinugasa, and T. Yamagishi, "Lithium Intercalation Behavior Into Iron Cyanide Complex as Positive Electrode of Lithium Secondary Battery", *Journal of Power Sources* 1999, 79, 215-219.

[3] Y. Lu, L. Wang, J. Cheng, and J. B. Goodenough, "Prussian Blue: A New Framework for Sodium Batteries", *Chemical Communications* 2012, 48, 6544-6546.

[4] L. Wang, Y. Lu, J. Liu, M. Xu, J. Cheng, D. Zhang, and J. B. Goodenough, "A Superior Low-Cost Cathode for a Na-ion Battery", *Angewandte Chemie International Edition* 2013, 52, 1964-1967.

[5] A. Eftekhari, "Potassium Secondary Cell Based on Prussian Blue Cathode", *Journal of Power Sources* 2004, 126, 221-228.

[6] C. D. Wessells, R. A. Huggins, and Y. Cui, "Copper Hexacyanoferrate Battery Electrodes with Long Cycle Life and High Power, *Nature Communications* 2011, 2, Article number: 550.

[7] C. D. Wessells, S. V. Peddada, R. A. Huggins, and Y. Cui, "Nickel Hexacyanoferrate Nanoparticle Electrodes for Aqueous Sodium and Potassium Ion Batteries", *Nano Letters* 2011, 11, 5421-5425.

[8] C. D. Wessells, S. V. Peddada, M. T. McDowell, R. A. Huggins, and Y. Cui, "The Effect of Insertion Species on Nanostructured Open Framework Hexacyanoferrate Battery Electrodes", *Journal of The Electrochemical Society* 2012, 159, A98-A103.

[9] T. Matsuda M. Takachi, and Y. Moritomo, "A Sodium Manganese Ferrocyanide Thin Film for Na-ion Batteries", *Chemical Communications* 2013, 49, 2750-2752.

[10] S-H. Yu, M. Shokouhimehr, T. Hyeon, and Y-E. Sung, "Iron Hexacyanoferrate Nanoparticles as Cathode Materials for Lithium and Sodium Rechargeable Batteries", *ECS Electrochemistry Letters* 2013, 2, A39-A41.

[11] M. Hu and J. S. Jiang, "Facile Synthesis of Air-Stable Prussian White Microcubes via a Hydrothermal Method", *Materials Research Bulletin* 2011, 46, 702-707.

[12] S-H. Lee and Y-D. Huh, "Preferential Evolution of Prussian Blue's Morphology from Cube to Hexapod", *Bulletin of the Korean Chemical Society* 2012, 33, 1078-1080.

[13] M. Hu, J-S. Jiang, C-C. Lin, and Y. Zeng, "Prussian Blue Mesocrystals: An Example of Self-Construction", *Cryst Eng Comm* 2010, 12, 2679-2683.

[14] M. Hu, R-P. Ji, J-S. Jiang, "Hydrothermal Synthesis of Magnetite Crystals: From Sheet to Pseudo-Octahedron", *Materials Research Bulletin* 2010, 45, 1811-1815.

[15] R. K. Patil, S. A. Chimatadar, and S. T. Nandibewoor, "Oxidation of Thiosulfate by Hexacyanoferrate(III) in Aqueous Perchloric Acid Medium—A Kinetic and Mechanistic Study", *Indian Journal of Chemistry* 2009, 48A, 357-361.

It would be advantageous if $Na_{1+x}Fe_2(CN)_6$ (x=0 to 1) containing a high concentration of sodium ions could be synthesized using a simple, low-cost process.

SUMMARY OF THE INVENTION

In contrast to $(NaFe_2(CN)_6)$, transition metal hexacyanoferrates (TMHCFs) with a high sodium content (i.e. $Na_{1+x}Fe_2(CN)_6$ (x=0 to 1)) can be directly employed as a cathode material in sodium-ion batteries (NIBs) with a non-sodium-containing anode to achieve a high capacity. This is advantageous since convenient storage of $Na^+$ in the $Na_{1+x}Fe_2(CN)_6$ (x=0 to 1) cathode provides greater flexibility with respect to potential anode candidates. Although a standard precipitation process is beneficial for synthesizing TMHCFs via low cost methods that are scalable to production capacity using existing manufacturing infrastructures, the realization of $Na_{1+x}Fe_2(CN)_6$ (x=0 to 1) by precipitation process heretofore has remained elusive due to the facile and nearly instantaneous oxidation of Fe(II) to Fe(III) during the process. In general, the oxidation may be promoted by several factors including: (1) oxidation by presence of oxygen in the reaction solution(s) and/or atmosphere, (2) Fe(III) impurities in the Fe(II) reagent(s), and/or (3) accelerated oxidation of Fe(II) to Fe(III) at higher pH values for the reaction solutions. Of course, Lu et al. previously demonstrated that $Na_{1.6}Fe_2(CN)_6$ could be synthesized from $Na_4Fe(CN)_6$ via a hydrothermal process in the presence of anti-oxidants (parent application U.S. Ser. No. 14/067,038) to afford a material capable of delivering a charge capacity of 135 milliamperes hours per gram (mAh/g). In spite of this success, hydrothermal processing requires high temperatures and extended periods of times, both of which are expected to increase associated costs.

In response to this, a method has been demonstrated for the synthesis of $Na_{1+x}Fe_2(CN)_6$ (x=0 to 1) that does not require a hydrothermal process. To a solution containing a dissolved source of $Fe(CN)_6^{4-}$ is added a reducing agent (Solution 1). A second solution containing a Fe(II) source and a reducing agent (Solution 2) are added to Solution 1, which may include the dropwise addition of Solution 2 into Solution 1. Prior to dissolution of Fe(II) sources and reducing agents to form Solutions 1 and 2, the solvents employed (water, alcohols and/or combinations thereof, for example) are purged with inert gas (nitrogen or argon) until rendered substantially oxygen-"free". Preferably, the contacting of Solutions 1 and 2 occurs in an atmosphere sufficiently deficient in molecular oxygen (e.g., less than 10 parts-per-million, (ppm)).

Mechanistically, the reducing agent(s) constantly replenish(es) the Fe(II) species [from Fe(III)] under those conditions at which oxidation to Fe(III) occurs, whether it proceeds (1) initially (oxidation in Solution 2), (2) following addition of Solution 2 to Solution 1, or (3) at any point during the synthesis. At the same time, the reducing agent also functions to convert any residual Fe(III) present in the $Fe(CN)_6^{4-}$ reagent to the desired Fe(II) species. Previously, Patil et al. demonstrated the reduction of $Fe(CN)_6^{3-}$ to $Fe(CN)_6^{4-}$ upon the action of thiosulfate (reducing agent) in acidic media.[15]

Accordingly, a method is provided for synthesizing iron hexacyanoferrate (FeHCF). The method forms a first solution of a ferrocyanide source $[A_4Fe(CN)_6 \cdot pH_2O]$ dissolved in a first solvent, where "A" is an alkali metal ion; and, where p is in a range of 0 to 10.

A second solution is formed of a Fe(II) source dissolved in a second solvent. A reducing agent is added to the first solution, the second solution, or both the first and second solutions. The second solution is combined with the first solution to form a third solution in a low oxygen environment. Prior to dissolution of ferrocyanide $[A_4Fe(CN)_6 \cdot pH_2O]$ source and Fe(II) source (i.e. forming the first and second solutions), the solvents employed may be purged with inert gas (e.g., nitrogen or argon) until rendered substantially oxygen-"free". Optionally, an alkali metal salt is added to the first solution, the second solution, or both the first and second solutions. The third solution is agitated in a low oxygen environment, and $A_{X+1}Fe_2(CN)_6 \cdot zH_2O$ is formed, where X is in the range of 0 to 1; and, where z is in the range of 0 to 7.

The method isolates the $A_{X+1}Fe_2(CN)_6 \cdot zH_2O$ from the third solution, and dries the $A_{X+1}Fe_2(CN)_6 \cdot zH_2O$ under vacuum at a temperature greater than 60 degrees C.

Typically, the reducing agent is a sulfur-containing material such as thiosulfate $(S_2O_3)^{2-}$, sulfite $(SO_3)^{2-}$, bisulfite $(HSO_3)^-$, metabisulfite $(S_2O_5)^{2-}$, or combinations thereof. The Fe(II) source may be Fe(II) acetate, Fe(II) bromide, Fe(II) chloride, Fe(II) nitrate, Fe(II) oxalate, Fe(II) phosphate, Fe(II) sulfate, Fe(II) salts, Fe(II) complexes, or combinations thereof. The first and second solvents are independently selected from a group including deoxygenated water, alcohols, and polar solvents. As used herein, a polar solvent is characterized by a dielectric constant greater than 15.

Additional details of the above-described method and a method for fabricating a battery electrode are provided below.

DETAILED DESCRIPTION

Described herein is a process for synthesizing FeHCF with a high sodium content ($Na_{1+x}Fe_2(CN)_6$ (x=0 to 1)) via a straightforward process employing a solution of a $Fe(CN)_6^{4-}$ source (Solution 1) and a solution of a Fe(II) source (Solution 2), wherein one (or both) of the "precursor" solution(s) contains appropriate stoichiometric quantities of reducing agent in order to maintain Fe species in the Fe(II) state. Due to the facile oxidation of Fe(II) to Fe(III), the precursor solutions are preferably maintained in an environment that is substantially free of molecular oxygen. Furthermore, the solvents used for forming Solutions 1 and 2 may be purged with inert gas (e.g., nitrogen or argon) prior to dissolution of both $Fe(CN)_6^{4-}$ and Fe(II) sources. Finally, it is most appropriate to manipulate ("work-up") the $Na_{1+x}Fe_2(CN)_6$ (x=0 to 1) reaction product in an atmosphere significantly free of oxygen in order to prevent oxidation of the product both during "washings" (described below) and in its pristine (solid) state. Experimental details and results relevant to the technology are provided below.

In a first set of experiments, sodium ferrocyanide decahydrate ($Na_4Fe(CN)_6 \cdot 10H_2O$, 0.2 millimoles (mmol)) was dissolved in deoxygenated water (10 milliliters (mL)) together with sodium thiosulfate ($Na_2S_2O_3$) and sodium chloride (NaCl) [Solution 1]. Separately, a source of Fe(II) (0.3 mmol) was dissolved in deoxygenated water (5 mL) together with sodium thiosulfate ($Na_2S_2O_3$) [Solution 2]. NaCl was strategically employed for the purposes of maintaining a high Na concentration in the reaction solution to favor $Na^+$ intercalation into the FeHCF framework, although it is not a requirement. An excess of reducing agent (thiosulfate in this case) was used to provide Fe(II) as the overwhelmingly dominant species in solution(s) and to compensate for residual levels of molecular oxygen that might persist even after purging the solutions with inert gas. Next, Solution 2 [Fe(II) source+$Na_2S_2O_3$] was added dropwise into Solution 1 [$Na_4Fe(CN)_6 \cdot 10H_2O + Na_2S_2O_3 + NaCl$] with vigorous stirring at room temperature in a nitrogen-filled glove box at an oxygen level of less than 1 part per million (ppm) with subsequent stirring at room temperature (>12 hours (h)).

In a control experiment, sodium ferrocyanide decahydrate ($Na_4Fe(CN)_6 \cdot 10H_2O$, 0.2 mmol) was dissolved in deoxygenated water (10 mL) together with sodium chloride (NaCl), but without the $Na_2S_2O_3$ reducing agent [Solution 1]. Separately, a source of Fe(II) (0.3 mmol) was dissolved in deoxygenated water (5 mL) without $Na_2S_2O_3$ [Solution 2]. Next, Solution 2 [Fe(II) source] was added dropwise into Solution 1 [$Na_4Fe(CN)_6 \cdot 10H_2O + NaCl$] with vigorous stirring at room temperature in a nitrogen-filled glove box at an oxygen level of less than 1 ppm with subsequent stirring at room temperature (>12 h).

In general, a precipitation process employing $Na_4Fe(CN)_6 \cdot 10H_2O$ and Fe(II) solutions yields a dark blue precipitate [consistent with $Na_{1-x}Fe_2(CN)_6$ (x≤1)] under ambient environmental conditions that include molecular oxygen and exclude appropriate reducing agents. As discussed above, this result is consistent with the facile oxidation of Fe(II) to Fe(III) in the presence of oxygen. As can be seen from the respective appearance of the control (blue) and experimental (nearly colorless) reaction solutions, the synthesis of $Na_{1+x}Fe_2(CN)_6$ (x=0 to 1) is possible in those cases where appropriate control over conditions (mainly exclusion of oxygen) is maintained. However, in the case of the attempted synthesis of $Na_{1+x}Fe_2(CN)_6$ (x=0 to 1) in oxygen-free environment which excludes a reducing agent in the reaction solution (control), a blue colored product is still obtained, which indicates that a proportion of Fe(II) has been oxidized to Fe(III) during the process. Although it may be suspected that the origin of the Fe(III) source may be one (or both) of the Fe(II)-containing reagents, an investigation of the Fe(III) content in the reagents dismisses this possibility. In contrast, $Na_{1+x}Fe_2(CN)_6$ (x=0 to 1) synthesized in an oxygen-free environment in the presence of a reducing agent in the reaction solution (experimental) affords a nearly colorless reaction product which reflects the fact that negligible amounts of Fe(III) are present in the product. Not surprisingly, the reducing agent replenishes the Fe(II) species by scavenging any Fe(III) in solution(s), whether it be initially present or formed during the course of the process. In order to eliminate variables, $Na_{1+x}Fe_2(CN)_6$ was synthesized via both control (oxygen free without reducing agent) and experimental (oxygen-free with reducing agent) pathways in parallel, using the same sources of reagents and solvents, and carried out under the same atmospheric conditions (<1 ppm oxygen) at the same time.

The reaction vials for the control and experimental syntheses were removed from the nitrogen atmosphere after which time the precipitates were collected by centrifugation, washed with water (2x), washed with acetone (1x), and dried under vacuum at 70° C. for 12 h. During the "washings", slow oxidation for both the control and experimental samples occurred as evidenced by a change to a blue color, which progressed to darker shades with increased exposure to the ambient atmosphere. The oxidation of Fe(II) to Fe(III) in the synthesized materials was clearly facilitated by the small particle size (high surface area) due to synthesis at room temperature. As a result, it is likely that control over atmospheric oxygen is beneficial during manipulation of $Na_{1+x}Fe_2(CN)_6$ (x=0 to 1) following synthesis.

In order to both verify the previous experimental observations and assess the oxygen "tolerance" with respect to the synthesis of $Na_{1+x}Fe_2(CN)_6$ (x=0 to 1) under substantially anaerobic conditions in the presence of reducing agent, a separate synthesis was performed under identical parameters with the exception that the reaction was carried out in an atmosphere containing higher levels of oxygen (≤10 ppm). In addition, subsequent washing and drying processes (after reaction was complete) were similarly carried out in the same controlled environment (≤10 ppm). Under these conditions, a white (solid) product consistent with $Na_{1+x}Fe_2(CN)_6$ (x=0 to 1) could be obtained reproducibly.

Taking into consideration the various supporting experimental evidence, it may be that conditions that include either complete elimination of oxygen or, alternatively, appropriate amounts of reducing agent (employed exclusively by themselves) can produce $Na_{1+x}Fe_2(CN)_6$ (where x is close to 1). In the case of oxygen-free conditions, the strict requirement for exclusion of virtually all oxygen qualifies the process as impractical, if not impossible. On the other hand, the amount of reducing agent required to convert all Fe(III) generated from oxidation of Fe(II) by oxygen present in both the solvents and atmosphere complicates matters in terms of cost and subsequent removal of oxidized by-products [from reduction of Fe(III)] following the synthesis process]. Therefore, the method for synthesizing $Na_{1+x}Fe_2(CN)_6$ (x=0 to 1) by a straightforward process may benefit from both a substantially oxygen-free environment and appropriate levels of reducing agent dissolved in solution.

Figure 3:
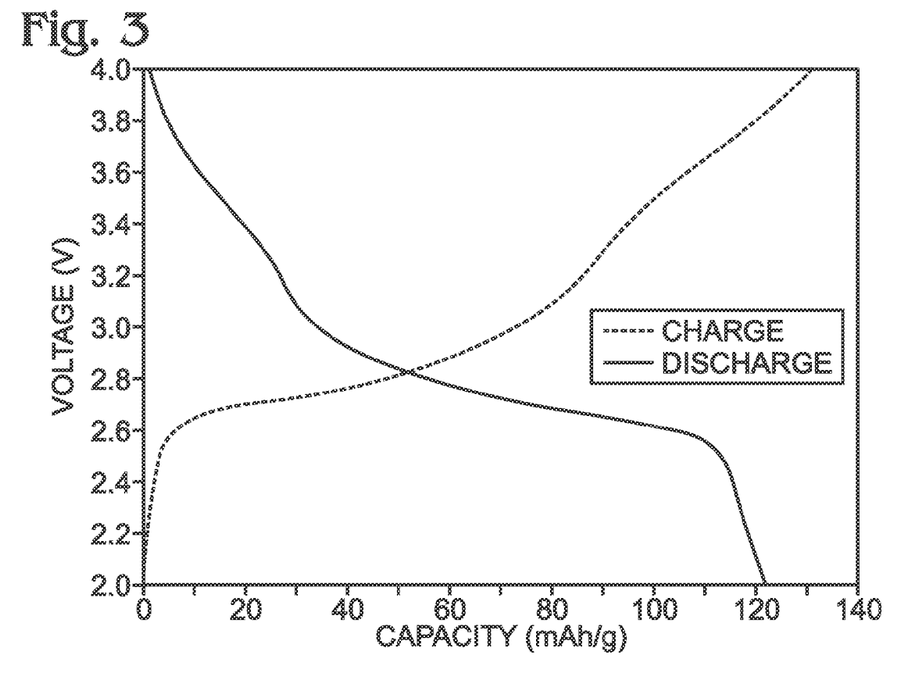
FIG. 3 is a graph depicting the charge/discharge voltage profiles versus capacity for FeHCF ($Na_{1+x}Fe_2(CN)_6$ (x=0 to 1)) cycled at a current density of 10 mA/g using sodium perchlorate ($NaClO_4$) in ethylene carbonate (EC)/diethyl carbonate (DEC) as an electrolyte.

FIG. 3 is a graph depicting the charge/discharge voltage profiles versus capacity for FeHCF ($Na_{1+x}Fe_2(CN)_6$ (x=0 to 1)) cycled at a current density of 10 mA/g using sodium perchlorate ($NaClO_4$) in ethylene carbonate (EC)/diethyl carbonate (DEC) as an electrolyte.

Figure 4:
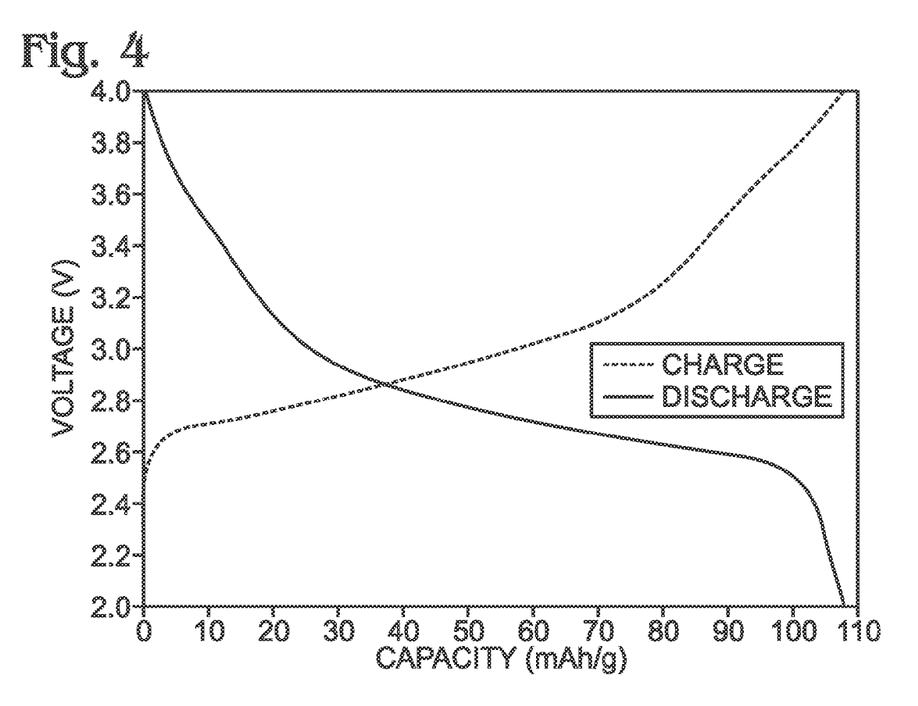
FIG. 4 is a graph depicting the charge/discharge voltage profiles versus capacity for FeHCF ($Na_{1+x}Fe_2(CN)_6$ (x=0 to 1)) cycled at a current density of 100 mA/g using $NaClO_4$ in EC/DEC as an electrolyte.

FIG. 4 is a graph depicting charge/discharge voltage profiles versus capacity for FeHCF ($Na_{1+x}Fe_2(CN)_6$ (x=0 to 1)) cycled at a current density of 100 mA/g using $NaClO_4$ in EC/DEC as an electrolyte.

Free-standing electrodes consisting of 70 wt % FeHCF material (prepared in the manner(s) described above), 20 wt % Ketjen Black (conductive carbon), and 10 wt % polytetrafluoroethylene (PTFE) (binder) were fabricated using amyl acetate as processing aid in an argon-filled glovebox. The electrodes were punched into circular disks and subsequently dried ~110-120° C. under vacuum for >12 h. Batteries comprising a FeHCF cathode, metallic sodium anode, and a glass fiber membrane interposed between were assembled in a coin cell configuration with sodium perchlorate ($NaClO_4$) in ethylene carbonate (EC)/diethyl carbonate (DEC) (1:1) as an electrolyte. The charge/discharge (voltage) profiles versus capacity for prototype batteries evaluated at current densities of 10 mA/g and 100 mA/g are shown in FIGS. 3 and 4, respectively.

In terms of the process, the following assertions can be put forth with respect to both scope and limitations for the technology:

(1) Solution 1:

Ideally, this solution contains a source of ferrocyanide $[Fe(CN)_6^{4-}]$ such as $Na_4Fe(CN)_6 \cdot 10H_2O$. As discussed above, NaCl (or alternative $Na^+$-containing salt) may be strategically employed for the purposes of providing a high $Na^+$ concentration in the reaction solution in order to promote $Na^+$ intercalation into the FeHCF framework. Although $Na_{1+x}Fe_2(CN)_6$ has been emphasized throughout, the technology is not limited to sodium ions ($Na^+$). In fact, the technology can be reasonably extended to include alternative $A_{1+x}FeFe(CN)_6$ (x=0 to 1) analogues for which "A" may be lithium ($Li^+$, $Li_{1+x}Fe_2(CN)_6$), potassium ($K^+$, $K_{1+x}Fe_2(CN)_6$), cesium ($Cs^+$, $Cs_{1+x}Fe_2(CN)_6$), or even combinations of 2 or more alkali metal ions whereby "A" is represented by $A_{x1}$, $A_{x2}$, $A_{x3}$, etc. (1≤x1+x2+x3≤2). Of course, the alkali metal ion salt used corresponds to the identity of "A" in $A_{1+x}FeFe(CN)_6$ (x=0 to 1), for example, NaCl for "A"=$Na^+$, KCl for "A"=$K^+$, etc. The solvent candidates employed for Solution 1 are limited to those (and/or combinations of those) solvents that are able to dissolve the Fe(II) source [$(Fe(CN)_6^{4-}]$, reducing agent(s) and, optionally, alkali metal salt(s) used. In light of this, the solvent may be water or a binary/ternary mixture of water, alcohols and/or other polar solvents such as acetonitrile, N,N-dimethylformamide, dimethylsulfoxide, ketones (such as acetone), as well as others.

(2) Solution 2:

This solution contains a source (or sources) of Fe(II) which may include Fe(II) acetate, Fe(II) bromide, Fe(II) chloride, Fe(II) nitrate, Fe(II) oxalate, Fe(II) phosphate, Fe(II) sulfate, Fe(II) salts, Fe(II) complexes, and combinations thereof.

The solvent candidates for Solution 2 are similarly limited to those (and/or combinations of those) solvents that are able to dissolve the Fe(II) source and reducing agent(s). In light of this, the solvent may be water or a binary/ternary mixture of water, alcohols and/or other polar solvents such as acetonitrile, N,N-dimethylformamide, dimethylsulfoxide, ketones (such as acetone), as well as others.

(3) Alkali Metal Source(s) in Solution 1:

These sources consist of alkali metal ion sources (typically salts) of sodium ($Na^+$), lithium ($Li^+$), potassium ($Na^+$), and/or cesium ($Cs^+$), and may include alkali metal acetates, ascorbates, bromides, citrates, chlorides, formates, iodides, nitrates, oxalates, phosphates, etc., including combinations thereof.

(4) Reducing Agent(s) in Solution and/or Solution 2:

Attributes include (1) ability to chemically reduce Fe(III) to Fe(II), (2) facile removal of the corresponding oxidation product derived from reducing agent (reducing agent is oxidized to a different species in response to reducing Fe(III) to Fe(II) as per conventional oxidation/reduction chemistry), and (3) lack of "negative" chemical reaction/interaction (such as degradation) with FeHCF material during/after synthesis by action of reducing agent. For the technology described herein, thiol-based (sulfur, S-containing) reducing agents have been employed for reducing Fe(III) to Fe(II) in solution. Conveniently, certain thiol-based agents tend to form transient complexes with Fe(III) prior to providing the reduced species [Fe(II)]. A number of these reducing agents appear to operate through a common mechanism, which although not definitively known, proceeds through a vibrant (colored) and transient complex characterized by a chemical bond between Fe and S, which is followed by dissociation to yield Fe(II) from Fe(III). For proof of concept, sodium thiosulfate was employed for the technology described herein. Possible S-containing compounds for reducing Fe(III) to Fe(II) include thiosulfate, sulfites, bisulfites, and metabisulfites.

(5) Synthesis Process:

The addition of Solution 2 to Solution 1 may occur at room temperature or elevated temperatures. Following addition, the reaction is typically continued (with stirring) from several minutes to several days. At this stage, it may be beneficial to maintain the reaction solution (representing components of Solutions 1 and 2) at elevated temperature, which may increase reaction yield, decrease the FeHCF defects (surface and/or internal), and modulate particle size, etc. Typically, the temperature can be elevated to the point at which the solvent/solvent mixture achieves gentle reflux.

(6) Post-Synthesis:

The solid precipitate [$Na_{1+x}Fe_2(CN)_6$ (x=0 to 1)] can be isolated from the reaction solution by filtration, centrifugation, and/or other conventional methods for separating solids from liquids. Optionally, subsequent "washing" of the solid reaction product may follow using solvents which may be the same or different from those used during synthesis. Optionally, the [$Na_{1+x}Fe_2(CN)_6$ (x=0 to 1)] may be dried, preferably under inert atmosphere or vacuum conditions to avoid oxidation of Fe(II) to Fe(III). Furthermore, all post-synthesis manipulations (washings, drying, etc.) may be performed in an environment that is sufficiently free of oxygen and/or oxidizing agents.

In summary, a method is reported herein for preparing $Na_{1+x}Fe_2(CN)_6$ (x=0 to 1) by a process including substantially oxygen-free conditions used in combination with appropriate reducing agents to maintain Fe(II) species during the reaction and in the final material structure. A proof-of-concept demonstrating the successful application of the technology has been provided including chemistries, conditions, and experimental observations and data. Finally, the ability of $Na_{1+x}Fe_2(CN)_6$ (x=0 to 1) to be employed directly (and provide high capacity) as a cathode in sodium-ion batteries (NIBs) with non-sodium anode provides significant flexibility in terms of potential for utilization in combination with a diverse array of anode candidates.

Figure 5:
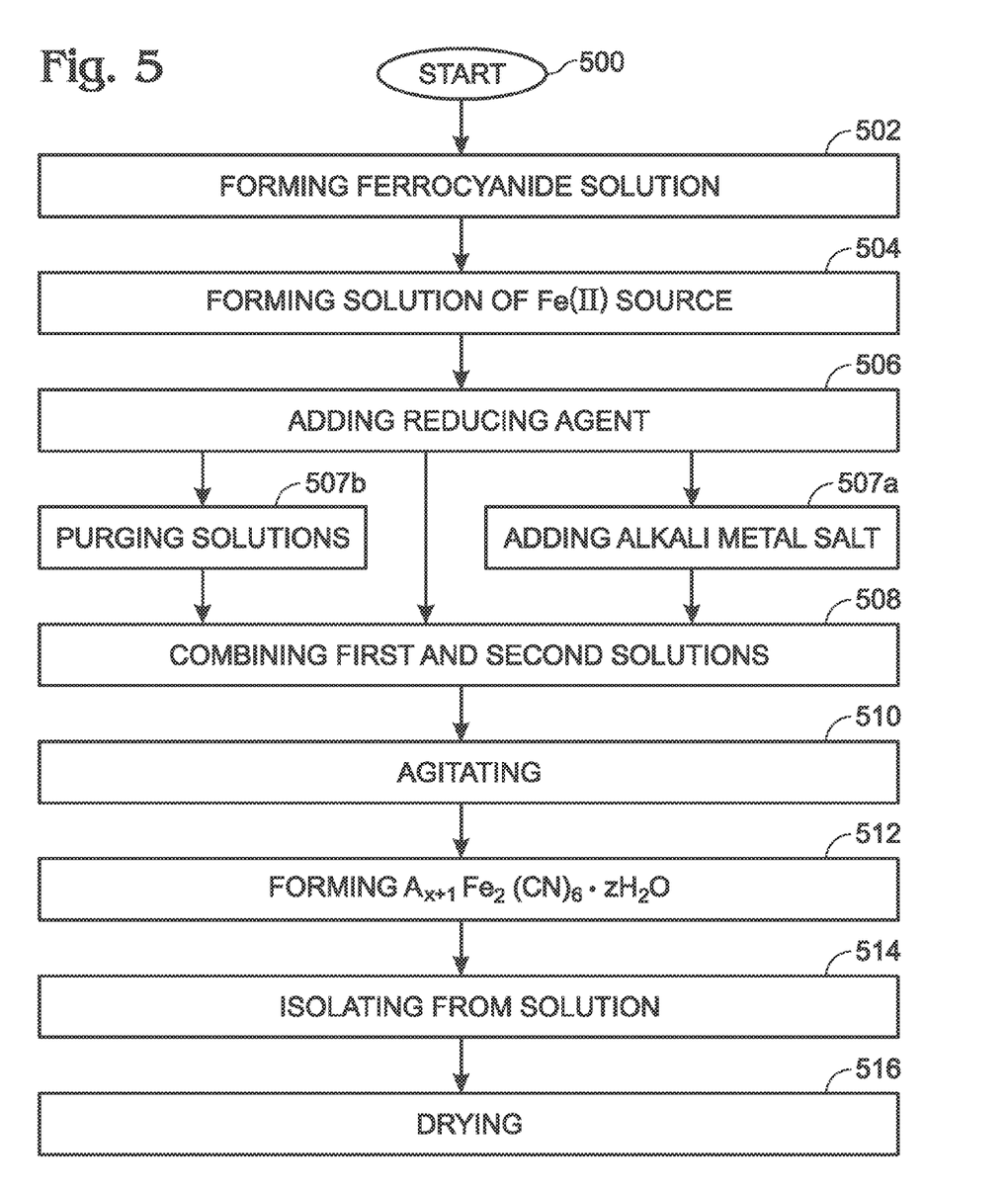
FIG. 5 is a flowchart illustrating a method for synthesizing $Na_{1+x}Fe_2(CN)_6$ (x=0 to 1).

FIG. 5 is a flowchart illustrating a method for synthesizing $Na_{1+x}Fe_2(CN)_6$ (x=0 to 1). Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 500.

Step 502 forms a first solution of a ferrocyanide source [$A_4Fe(CN)_6 \cdot pH_2O$] material dissolved in a first solvent,
where "A" is an alkali metal ion; and,
where p is in the range of 0 to 10.

For example, "A" may be lithium ($Li^+$), sodium ($Na^+$), potassium ($K^+$), cesium ($Cs^+$), or combinations thereof. Step 504 forms a second solution of a Fe(II) source dissolved in a second solvent. Step 506 adds a reducing agent to the first solution, the second solution, or both the first and second solutions. Optionally, Step 507a adds an alkali metal salt to the first solution, the second solution, or both the first and second solutions. The alkali metal salt in Step 507a may include $Li^+$, $Na^+$, $K^+$, $Cs^+$, or combinations thereof, such as alkali metal acetates ($CH_3CO_2^-$), ascorbates, bromides ($Br^-$), citrates, chlorides ($Cl^-$), formates ($HCO_2^-$), iodides ($I^-$), nitrates ($NO_3^-$), oxalates ($C_2O_4^{2-}$) phosphates ($PO_4^{3-}$), sulfates ($SO_4^{2-}$), or combinations thereof. In another aspect, prior to the performance of Step 508, the first and second solutions may be purged with an inert gas, such as nitrogen or argon, in Step 507b. Note: Steps 507a and 507b may both be performed.

Step 508 combines the second solution with the first solution to form a third solution in a low oxygen environment. Step 510 agitates (e.g. stirs) the third solution in a low oxygen environment. In one aspect, Step 510 is performed in an environment containing 10 ppm or less of oxygen.

Step 512 forms a $A_{x+1}Fe_2(CN)_6 \cdot zH_2O$ material,
where x is in the range of 0 to 1; and,
where z is in the range of 0 to 7.

Step 514 isolates the $A_{x+1}Fe_2(CN)_6 \cdot zH_2O$ material from the third solution, for example, by filtration or centrifugation, and Step 516 dries the $A_{x+1}Fe_2(CN)_6 \cdot zH_2O$ material under vacuum (in a vacuum environment) at a temperature greater than 60 degrees C.

Typically, the reducing agent of Step 506 is a sulfur-containing material, such as thiosulfate ($S_2O_3$)$^{2-}$, sulfite ($SO_3$)$^{2-}$, bisulfite ($HSO_3$)$^-$, metabisulfite ($S_2O_5$)$^{2-}$, or combinations thereof. The Fe(II) source of Step 504 may be Fe(II) acetate, Fe(II) bromide, Fe(II) chloride, Fe(II) nitrate, Fe(II) oxalate, Fe(II) phosphate, Fe(II) sulfate, Fe(II) salts, Fe(II) complexes, or combinations thereof.

The first and second solvents of Step 502 and 504 are independently selected from a group including deoxygenated water, alcohols, and polar solvents. As used herein, a polar solvent is characterized by a dielectric constant greater than 15. As used herein, "independently selected" means that the solvent used in Step 502 may differ from the one used in Step 504.

Figure 6:
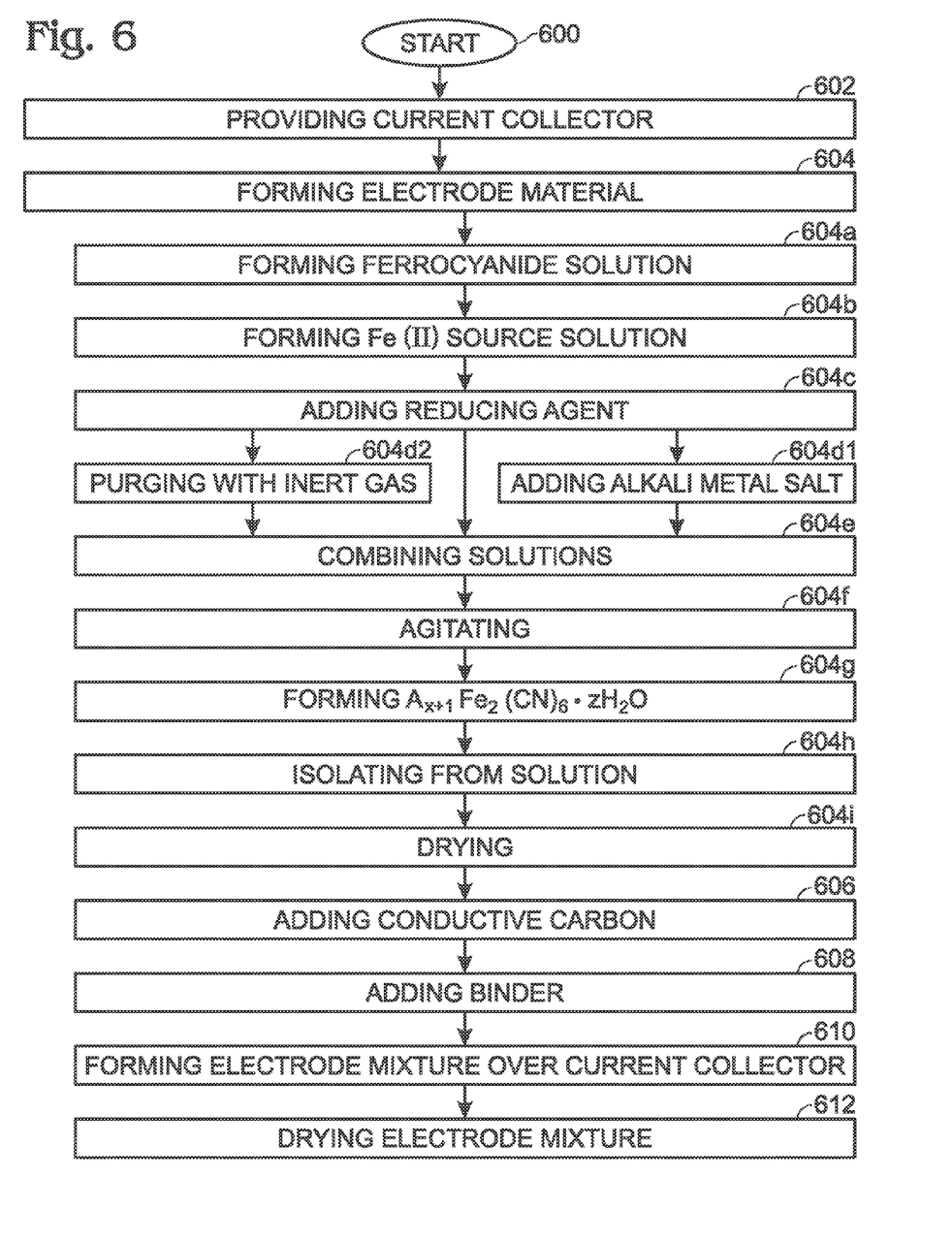
FIG. 6 is a flowchart illustrating a method for fabricating a battery electrode containing FeHCF ($Na_{1+x}Fe_2(CN)_6$ (x=0 to 1)).

FIG. 6 is a flowchart illustrating a method for fabricating a battery electrode containing FeHCF ($Na_{1+x}Fe_2(CN)_6$ (x=0 to 1)). The method begins at Step 600. Step 602 provides a current collector. The current collector may be a metal, such as aluminum, copper, nickel, or a conductive carbon material. Step 604 forms an electrode material using the following substeps. Step 604a forms a first solution of a ferrocyanide source [$A_4Fe(CN)_6 \cdot pH_2O$] material dissolved in a first solvent,
where "A" is an alkali metal ion; and,
where p is in the range of 0 to 10.

Step 604b forms a second solution of a Fe(II) source dissolved in a second solvent. Step 604c adds a reducing agent to the first solution, the second solution, or both the first and second solutions. Optionally, Step 604d1 adds an alkali metal salt to the first solution, the second solution, or both the first and second solutions. Optionally, Step 604d2 purges the first and second solutions with an inert gas. Step 604e combines the second solution with the first solution to form a third solution in a low oxygen environment. Step 604f agitates the third solution in a low oxygen environment. Step 604g forms $A_{x+1}Fe_2(CN)_6 \cdot zH_2O$,
where x is in the range of 0 to 1; and,
where z is in the range of 0 to 7.

Step 604h isolates $A_{x+1}Fe_2(CN)_6 \cdot zH_2O$ electrode material from the third solution. Step 604i dries the $A_{x+1}Fe_2(CN)_6 \cdot zH_2O$ electrode material under vacuum at a temperature greater than 60 degrees C. Details of substeps 604a through 604i have been provided above in the description of FIG. 5.

Step 606 adds conductive carbon materials to the $A_{x+1}Fe_2(CN)_6 \cdot zH_2O$ electrode material. Carbonaceous materials such as carbon particles, carbon fiber, carbon nanotubes, graphite, and graphene are possible examples of conductive carbon. Step 608 adds a binder material to form an electrode mixture. In one aspect, the binder material may include a polymer. For example, polyvinylidene fluoride (PVDF), sodium carboxymethylcellulose (Na-CMC), or a combination of Na-CMC and styrene-butadiene rubber (SBR), as examples, may be used as the binder. Typically, the ratio of $A_{x+1}Fe_2(CN)_6 \cdot zH_2O$ in the electrode mixture is in the range of 60 to 95% by weight (wt %), the ratio of conductive carbon materials in the electrode mixture is in the range of 0 to 30 wt %, and the ratio of binder material in the electrode mixture is in a range of 3 to 20 wt %. Step 610 forms the electrode mixture overlying the current collector. Step 612 dries the electrode mixture overlying the current collector under vacuum at a temperature of greater than 60 degrees C.

A process for the synthesis of iron hexacyanoferrate (FeHCF, $Na_{1+x}Fe_2(CN)_6$ (x=0 to 1)) has been provided, which is useful in the fabrication of battery electrodes. Examples of particular materials and process details have been presented to illustrate the invention. However, the invention is not limited to merely these examples. Other variations and embodiments of the invention will occur to those skilled in the art.

We claim:

1. A method for synthesizing iron hexacyanoferrate (FeHCF), the method comprising:
    forming a first solution of a ferrocyanide source [$A_4Fe(CN)_6 \cdot p\, H_2O$] material dissolved in a first solvent,
        where "A" is selected from the group consisting of alkali metal ions;
        where p is in a range of 0 to 10;
    forming a second solution of a Fe(II) source dissolved in a second solvent;
    adding a reducing agent to a solution selected from the group consisting of the first solution, the second solution, and both the first and second solutions;
    combining the second solution with e first solution to form a third solution in a low oxygen environment;
    agitating the third solution in a low oxygen environment; and,
    forming a $A_{X+1}Fe_2(CN)_6 \cdot zH_2O$ material,
        where x is in a range of 0 to 1; and,
        where z is in a range of 0 to 7.

2. The method of claim 1 where in the reducing agent is a sulfur-containing material.

3. The method of claim 2 wherein the sulfur-containing material is selected from the group consisting of thiosulfate $(S_2O_3)^{2-}$, sulfite $(SO_3)^{2-}$, bisulfite $(HSO_3)^-$, metabisulfite $(S_2O_5)^{2-}$, and combinations thereof.

4. The method of claim 1 wherein "A" is selected from the group consisting of lithium ($Li^+$), sodium ($Na^+$), potassium ($K^+$), cesium ($Cs^+$), and combinations thereof.

5. The method of claim 1 where the Fe(II) source is selected from the group consisting of Fe(II) acetate, Fe(II) bromide, Fe(II) chloride, Fe(II) nitrate, Fen oxalate, Fe(II) phosphate, Fe(II) sulfate, Fen salts, Fe(II) complexes, and combinations thereof.

6. The method of claim 1 wherein the first and second solvents are independently selected from the group consisting of deoxygenated water, alcohols, and polar solvents.

7. The method of claim 1 further comprising:
    adding an alkali metal salt to a solution selected from the group consisting of the first solution, the second solution, and both the first and second solutions.

8. The method of claim 7 wherein the alkali metal salt includes an alkali metal ion selected from the group consisting of $Li^+$, $Na^+$, $K^+$, $Cs^+$, and combinations thereof.

9. The method of claim 7 wherein the alkali metal salt is selected from the group consisting of alkali metal acetates ($CH_3CO_2^-$), ascorbates, bromides ($Br^-$), citrates, chlorides ($Cl^-$), formates ($HCO_2^-$), iodides ($I^-$) nitrates ($NO_3^-$), oxalates ($C_2O_4^{2-}$) phosphates ($PO_4^{3-}$), sulfates ($SO_4^{2-}$), and combinations thereof.

10. The method of claim 1 wherein agitating the third solution in a low oxygen environment includes an environment containing 10 parts per million (ppm) or less of oxygen.

11. The method of claim 1 further comprising:
    isolating the $A_{X+1}Fe_2(CN)_6 \cdot zH_2O$ material from the third solution; and,
    drying the $A_{X+1}Fe_2(CN)_6 \cdot zH_2O$ material under vacuum at a temperature greater than 60 degrees C.

12. The method of claim 1 further comprising:
    prior to combining the first and second solutions, purging the first and second solutions with an inert gas.

13. A method for fabricating a battery electrode, the method comprising:
    providing a current collector;
    forming an electrode material as follows:
        forming a first solution of a ferrocyanide source [$A_4Fe(CN)_6 \cdot pH_2O$] material dissolved in a first solvent,
            where "A" is selected from the group consisting of alkali metal ions;
            where p is in a range of 0 to 10;
        forming a second solution of a Fe(II) source dissolved in a second solvent;
        adding a reducing agent to a solution selected from the group consisting of the first solution, the second solution, and both the first and second solutions;
        combining the second solution with the first solution to form a third solution in a low oxygen environment;
        agitating the third solution in a low oxygen environment;
        forming a $A_{X+1}Fe_2(CN)_6 \cdot zH_2O$ electrode material,
            where X is in a range of 0 to 1;
            where z is in a range of 0 to 7;
        isolating the $A_{X+1}Fe_2(CN)_6 \cdot zH_2O$ electrode material from the third solution;
        drying the $A_{X+1}Fe_2(CN)_6 \cdot zH_2O$ electrode material under vacuum at a temperature greater than 60 degrees C.;
    adding conductive carbon materials to the $A_{X+1}Fe_2(CN)_6 \cdot zH_2O$ electrode material;
    adding a binder material to form an electrode mixture;
    forming the electrode mixture overlying the current collector; and,
    drying the electrode mixture overlying the current collector under vacuum at a temperature of greater than 60 degrees C.

14. The method of claim 13 wherein the ratio of $A_{X+1}Fe_2(CN)_6 \cdot zH_2O$ material in the electrode mixture is in a range of 60 to 95% by weight (wt %).

15. The method of claim 13 wherein the ratio of conductive carbon materials in the electrode mixture is in a range of 0 to 30 wt %.

16. The method of claim 13 wherein the ratio of binder material in the electrode mixture is in a range of 3 to 20 wt %.

17. The method of claim 13 wherein the binder material includes a polymer.

* * * * *

UNITED STATES PATENT AND TRADEMARK OFFICE
CERTIFICATE OF CORRECTION

PATENT NO.         : 9,546,097 B2
APPLICATION NO.    : 14/472228
DATED              : January 17, 2017
INVENTOR(S)        : Sean Vail, Yuhao Lu and Jong-Jan Lee

Page 1 of 1

It is certified that error appears in the above-identified patent and that said Letters Patent is hereby corrected as shown below:

In Column 13, at Line 23, in Claim 1, the word "the" after the word "with" and before the word "first" has been incorrectly printed as "e".

In Column 13, Line 41, in Claim 5, the phrase "Fe(II) salts" has been incorrectly printed as "Fen salts".

Signed and Sealed this
Eleventh Day of April, 2017

Michelle K. Lee
*Director of the United States Patent and Trademark Office*